United States Patent
Carlos Pereira Filho

(10) Patent No.: US 11,293,635 B2
(45) Date of Patent: Apr. 5, 2022

(54) REACTOR FOR A PROCESS OF ADVANCED COMBUSTION FOR BURNING BIOMASS AND WASTE

(71) Applicant: Alberto Carlos Pereira Filho, Sao Jose dos Campos (BR)

(72) Inventor: Alberto Carlos Pereira Filho, Sao Jose dos Campos (BR)

( * ) Notice: Subject to any disclaimer, the term of this patent is extended or adjusted under 35 U.S.C. 154(b) by 40 days.

(21) Appl. No.: 16/642,929

(22) PCT Filed: Sep. 3, 2018

(86) PCT No.: PCT/BR2018/050313
§ 371 (c)(1),
(2) Date: Feb. 28, 2020

(87) PCT Pub. No.: WO2019/041014
PCT Pub. Date: Mar. 7, 2019

(65) Prior Publication Data
US 2020/0348021 A1 Nov. 5, 2020

(30) Foreign Application Priority Data

Sep. 1, 2017 (BR) .......................... 102017018844-2

(51) Int. Cl.
*F23G 5/32* (2006.01)
*B09B 3/00* (2006.01)
*F23G 5/24* (2006.01)
*F27B 1/16* (2006.01)

(52) U.S. Cl.
CPC .............. *F23G 5/32* (2013.01); *B09B 3/0083* (2013.01); *F23G 5/245* (2013.01); *F27B 1/16* (2013.01); *F23G 2203/30* (2013.01); *F23G 2203/70* (2013.01)

(58) Field of Classification Search
CPC ........ F23G 5/32; F23G 5/245; F23G 2203/30; F23G 2203/70; F23G 5/24; B09B 3/0083; B09B 3/00; F27B 1/16; C10B 53/00
See application file for complete search history.

(56) References Cited

U.S. PATENT DOCUMENTS

| 5,307,748 A | 5/1994 | Khinkis et al. |
| 2001/0015160 A1 | 8/2001 | Brunnmair et al. |

FOREIGN PATENT DOCUMENTS

| BR | 9508632 A | 11/1997 |
| EP | 0676464 B1 | 10/2001 |
| JP | S5712216 A | 1/1982 |
| JP | H03282109 A | 12/1991 |
| JP | 2001227727 A | 8/2001 |
| JP | 2005003230 A | 1/2005 |
| KR | 100808140 B1 | 2/2008 |

OTHER PUBLICATIONS

International Search Report, Institute Nacional Da Propriedade Industrial, dated Nov. 22, 2018.

*Primary Examiner* — David J Laux
(74) *Attorney, Agent, or Firm* — Bay State IP, LLC

(57) ABSTRACT

In this application is disclosed a novel equipment for solid waste treatment in general, whose state of the art foresees various types of reactors for thermal processing of solid waste, it is constituted by a reactor that has the combustion processed under a thermal cyclone effect produced by air nozzles.

2 Claims, 5 Drawing Sheets

A-A CUT

B-B CUT

REACTOR FOR A PROCESS OF ADVANCED COMBUSTION FOR BURNING BIOMASS AND WASTE

CROSS REFERENCE TO RELATED APPLICATION

Figure 1:
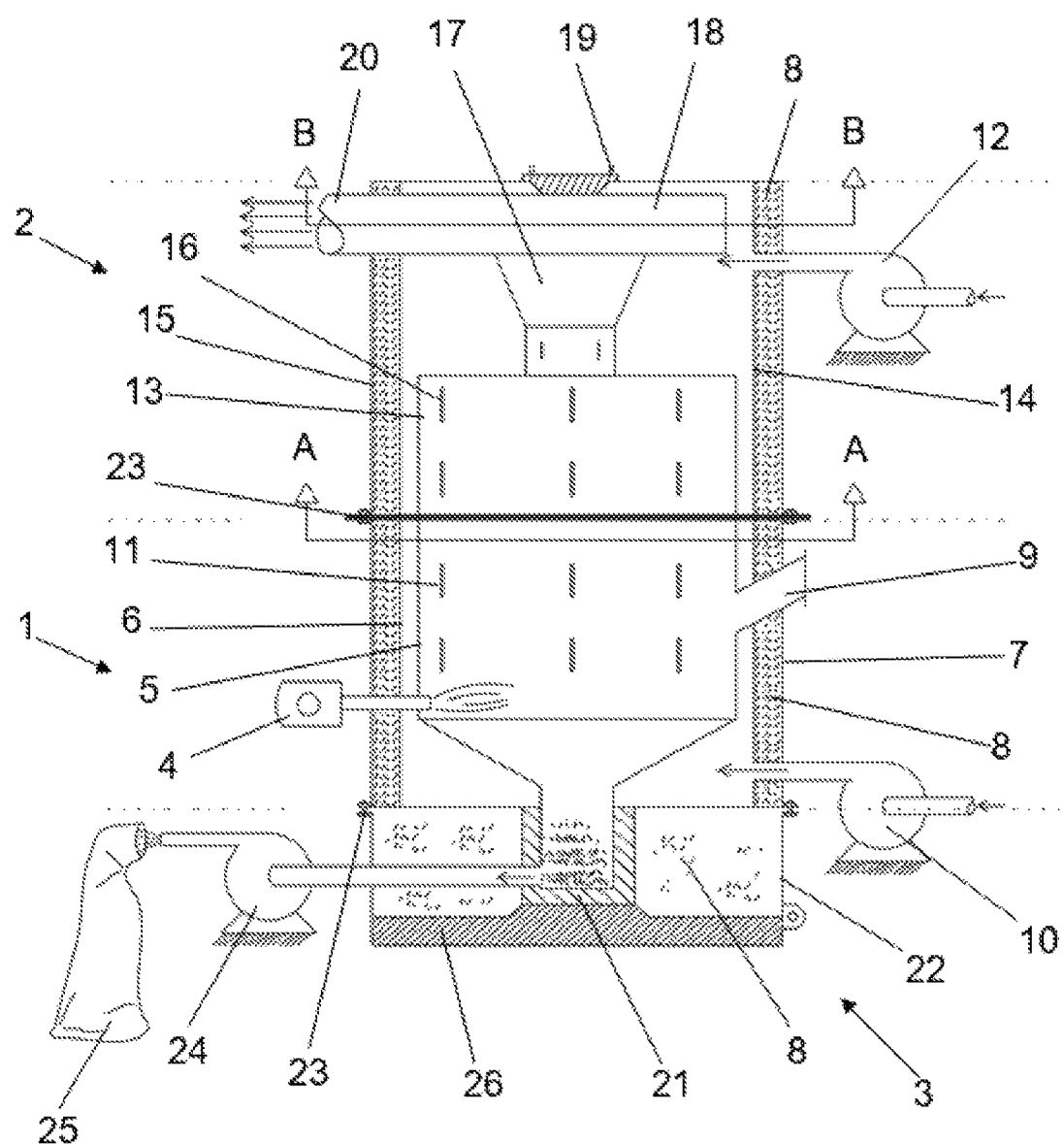

This application is for entry into the U.S. National Phase under § 371 for International Application No. PCT/BR2018/050313 having an international filing date of Sep. 3, 2018, and from which priority is claimed under all applicable sections of Title 35 of the United States Code including, but not limited to, Sections 120, 363, and 365(c), and which in turn claims priority under 35 USC 119 to Brazilian Patent Application No. 102017018844-2 filed on Sep. 1, 2017.

INVENTION FIELD

This patent for the privilege of invention "REACTOR FOR ADVANCED COMBUSTION PROCESS FOR BURNING BIOMASS AND WASTE" deals with an innovative alternative in combustion and emission control processes, which includes a reactor for burning biomass or treating solid waste (or liquid) based on the cyclone phenomenon, in which the gases rotate inside the reactor during the whole combustion process. It belongs to the field of equipment for treatment by burning solid (or liquid) industrial hazardous, chemical, pharmaceutical and industrial combustion waste in general.

More specifically, the object of this patent application presents a different configuration in relation to the traditional reactors, since it does not possess neither refractories in the combustion zone, nor afterburner, all the combustion of solid and combustible gases generated in the primary zone takes place in the thermal column of the reactor, throughout the process.

Therefore, in the patent application at hand, there is an equipment specially designed and developed to obtain vast convenience and which presents great economic and environmental advantages.

INVENTION HISTORY

As it is notably known by technicians on the subject, waste burning is a technique often regarded as harmful to human health and damaging to the environment, if not controlled. The quality of this waste burning naturally depends on the calorific value of the waste and the combustion parameters—reactor technology.

In order to carry out the burning properly, there must be investment in combustion technology, promoting high temperatures in the reactor, high residence time and substantial turbulence.

High temperatures, turbulences and the elevated retention time in the process are suitable for the safe and efficient consumption of the biomass or the waste during the combustion. Such conditions promote a clean and controlled burning, so that the operation does not cause the negative environmental impact that the poor burning has.

As innovation, this patent presents a reactor that operates by cyclone effect, which allows the controlled burning, with elevated residence time and elevated temperature, thus avoiding the generation of high levels of CO, HC, particulates and soot that drag toxic agents.

STATE OF THE ART

There are several types of reactors for thermal processing (burning) of solid waste in the market. Among them, the following stand out:

Grate Firing—In this kiln, the waste is incinerated on a grid—it is the most used technology in the world. This type of kiln performs the so-called biomass burning with few requirements of preprocessing, such as sizing, shredding, etc. It can burn waste without much preparation and with a high percentage of humidity. It normally works with the temperature of the internal gas ranging from 750° C. to 1,000° C. The air required for the combustion is supplied by fans or blowers coming from below and above the grid.

Rotary Kiln—this model is of the rotary type, whose main feature is the waste movement on its cylindrical surface, during the operation, in order to optimize the mixture of the fuel with the air and allow a more uniform burning. This type of technology is not so common for the incineration of solid urban waste as the grate kilns. These kilns normally operate with an internal gas temperature ranging from 800° C. to 1,000° C. and an afterburner chamber reaching temperatures that range between 850° C. and 1,200° C. In Brazil, it is commonly used in the clinker production process, which is part of one of the necessary steps for the production of cement, it is also used in the industry for other processes, such as the production of aluminum and for the production of metal alloys.

Fluidized bed combustion chamber—in this type of reactor, the combustion occurs through a process of fluidization of the chamber and operates with a layer of an inert material (normally sand) suspended by an air or gas flow inside the chamber, injected from the bottom and the sides of the chamber. The speed of the gas flow causes this flow to suspend the inert particles present in the chamber. The fuel (optional) and the adsorbent (normally limestone) are injected into the kiln and all the particles in the chamber are in a "liquid state", fluidized. This same air used to move the "fluid" within the chamber is also used as primary combustion air. This technology, when used for the incineration of urban waste, normally operates at a temperature between 750° C. and 1,000° C. with high efficiency of waste combustion.

The document BRPI9300454-0; Entitled "Integrated system for solid waste treatment with energy generation and self-sanitation" deals with the incineration with the cyclone reactor-combustor.

DEFICIENT POINTS OF THE STATE OF THE ART

Grate Firing presents the following disadvantages: Combustion instabilities with cold and hot burning points due to the irregular turbulence. Difficult to control the appropriate combustion conditions; low residence time.

The Rotary Kiln presents the following disadvantages: Great complexity due to the reactor spin has a high cost for the same reason; the equipment requires a lot of maintenance; irregular burning generating hot and cold spots during the combustion.

The Chamber of fluidized bed combustion presents the following disadvantages: More complex combustion control and process.

As it may be observed, no equipment and patent documents known to the state of the art fully present the constructive features of the equipment that is object of this patent application. None specifically concerns the elimination, with the use of a cyclone combustion reactor which involves the technique presented here.

INVENTION SUMMARY

In order to solve these inconveniences, studies have been originated throughout the time aiming to eliminate all these problems and inconveniences and, as a result, the object of this patent application, "REACTOR FOR ADVANCED COMBUSTION PROCESS FOR BURNING BIOMASS AND WASTE" has been developed, which includes an equipment with great efficiency coupled with the low cost of equipment acquisition and operation.

Therefore, this patent presents as innovation a reactor that operates by cyclone effect, which allows the controlled burning, with elevated residence time and elevated temperature, thus avoiding the generation of high levels of CO, HC, particles and soot that drag toxic agents.

BRIEF DESCRIPTION OF THE INVENTION DRAWINGS

To complement this description in order to obtain a better understanding of the features of this invention and according to a preferential practical realization of it, a set of drawings accompany the description attached, where, in an illustrated manner, though not restrictive, the following was represented:

FIG. 1—Shows a view in elevation of the reactor for advanced combustion process for burning biomass and waste.

Figure 2:
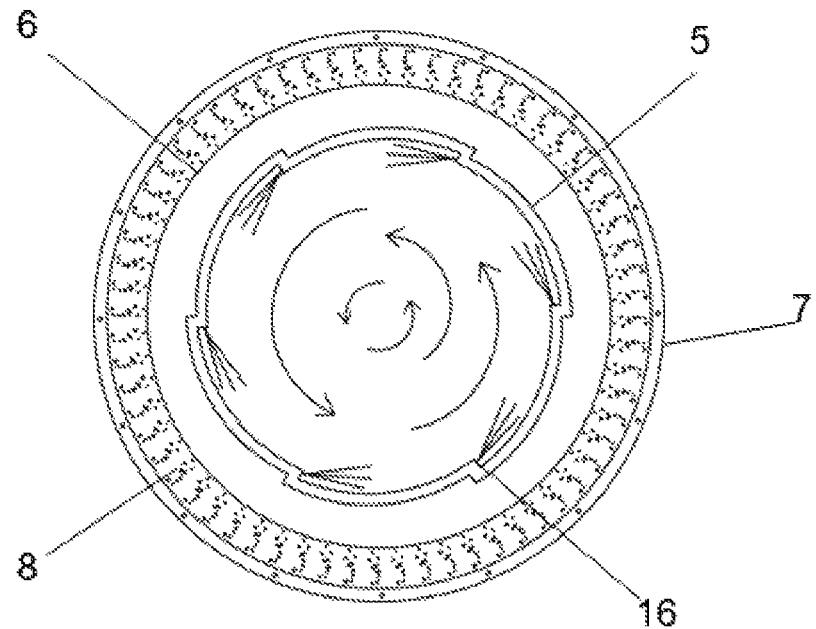

FIG. 2—Shows a cutaway view (AA section) of the reactor for advanced combustion process for burning biomass and waste.

Figure 3:
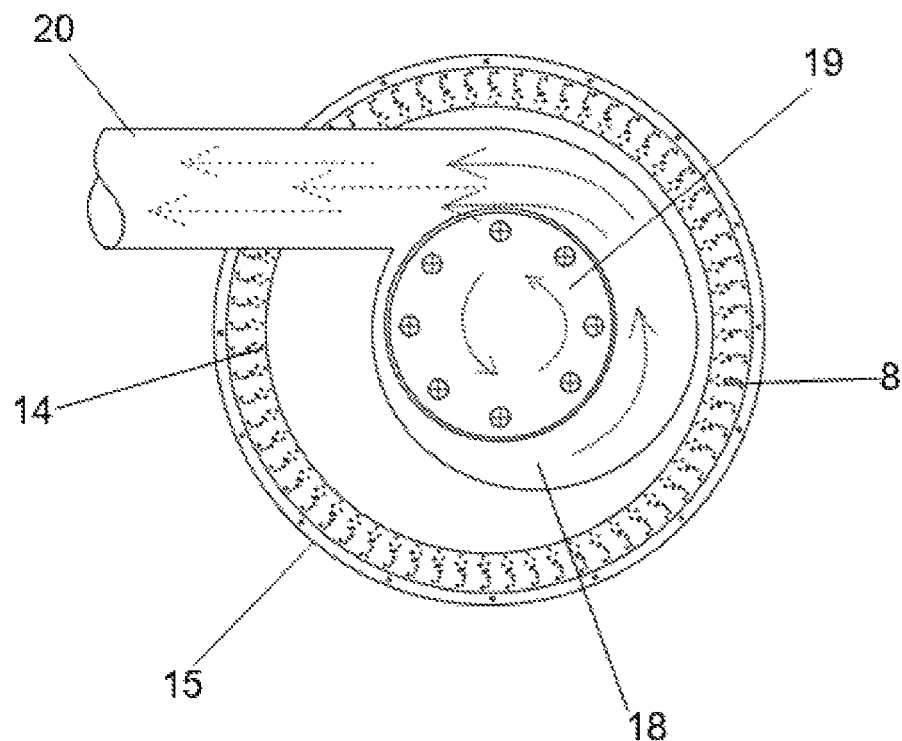

FIG. 3—Shows a cutaway view (BB section) of the reactor for advanced combustion process for burning biomass and waste.

Figure 4:
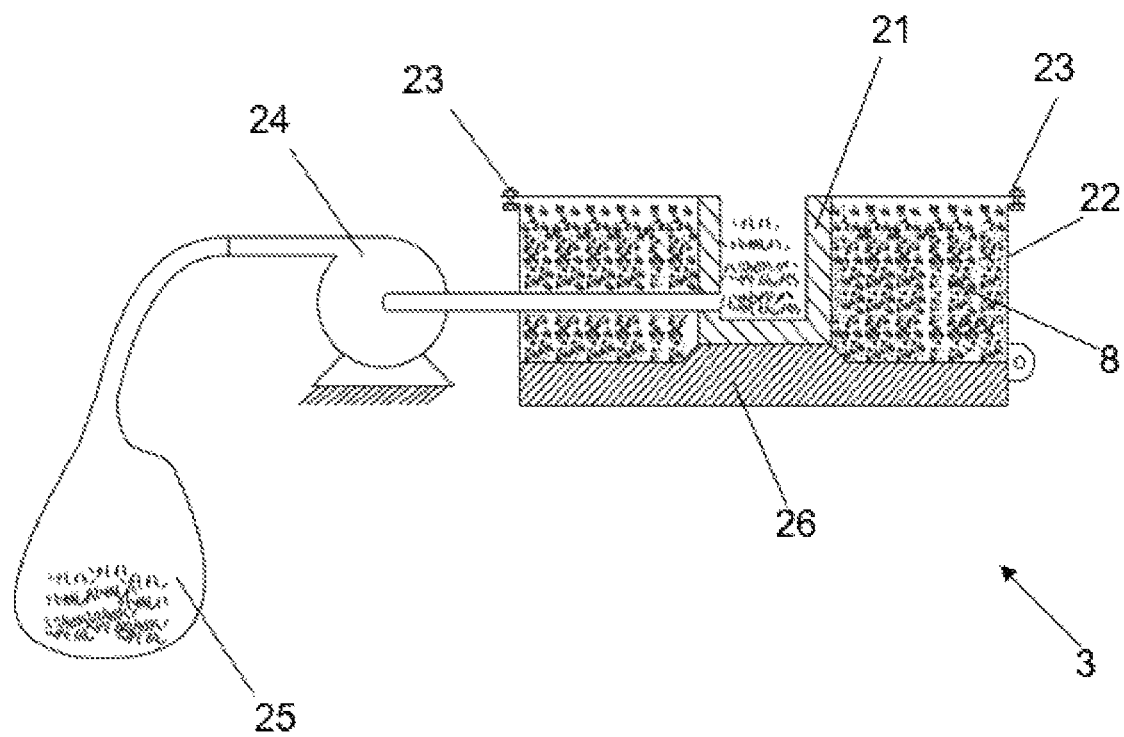

FIG. 4—Shows a detailed view of the disposal section of the reactor for advanced combustion process for burning biomass and waste.

Figure 5:
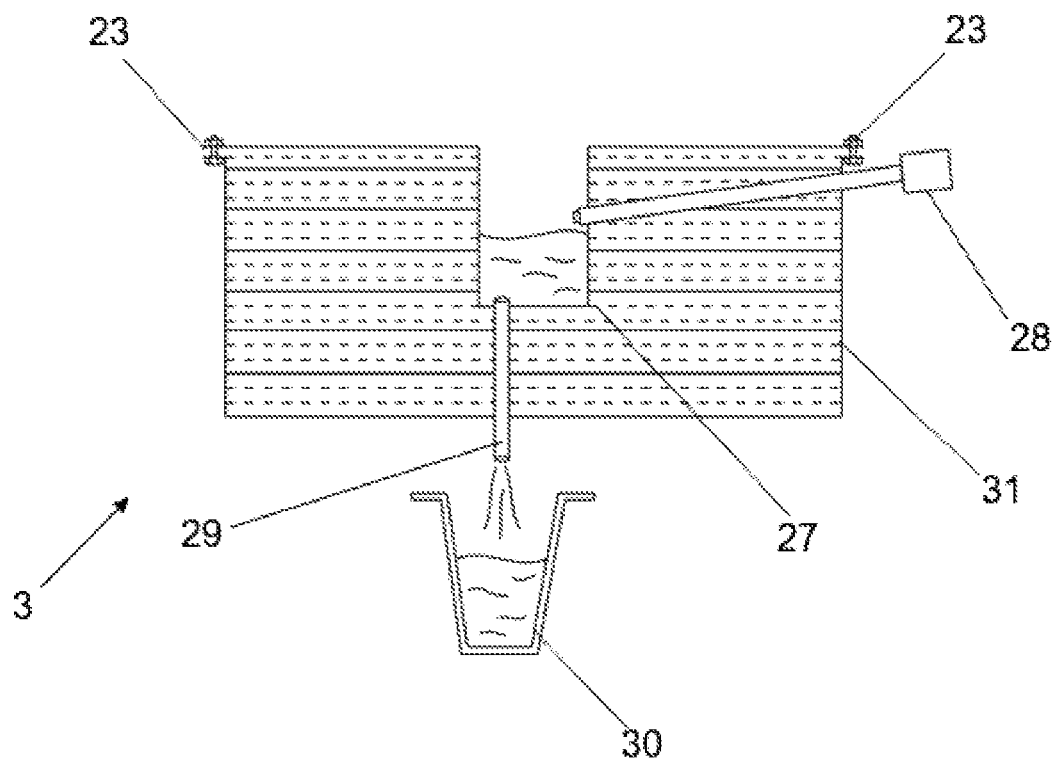

FIG. 5—Shows a view of an optional model of the disposal section which integrates the reactor for advanced combustion process for burning biomass and waste.

DETAILED DESCRIPTION OF THE INVENTION

According to the extent illustrated by the images related above, the "REACTOR FOR ADVANCED COMBUSTION PROCESS FOR BURNING BIOMASS AND WASTE" object to this patent is comprised of an equipment of circular vertical structure consisting of three sections: The central section (1), or combustor, where the combustion per se occurs; the dilution and extraction section (2), where the burning ends and the exit of the combustion gases by-products takes place and the disposal section (3), located in the inferior part of the reactor, where solid combustion by-products are formed and its disposal.

In the central section (1), the primary combustion phenomenon occurs, with the entry of solid (or liquid) material and air. This is where the process begins with the ignition and rich burning of the reagent material.

The central section (1) is assisted by a burner (4), to start the process and to ensure the burning complete stability, in case of extinguishing due to the presence of inert material or even high humidity.

More precisely, the central section (1) consists of a double wall made of steel: one internal (5) and one external (6).

Optionally, a third external wall (7), involving the two mentioned, may be added for greater thermal insulation. In this case, a glass wool type thermal insulating filler (8), between the external walls (6) and (7), may be used for greater insulation efficiency. In this section, according to image 1, there is a solid material (9) supply duct (for liquids, a feeding spray nozzle is used—not shown), communicating the inner part of the reactor through the sidewalls with the supply system (not shown) through which the waste is inserted into the reactor.

There is also, in the inferior part of this section, a blower (10) for supplying primary air between the walls (5) and (6) for their cooling and subsequent injection of this air, now preheated, into the inner part of the reactor, through bidimensional nozzles or tuyeres (11), tangentially located (image 2) on the internal wall (5), in order to produce the cyclone effect, other than aiding to cool the inner wall (5) of the reactor.

For a proper combustion, this blower has a flow control system (not shown) so that there is the correct mixing ratio between the waste mass and the amount of air required. This will depend on the type of waste and on its humidity degree.

As the material is being processed in the central chamber, the hot gases ascend towards the dilution and extraction section (2) and continue to burn by the cyclone combustion process and the heavier solid material descends to the disposal section (3).

The ashes and the heavier solid materials originated from the central section (1) of the primary burning are led to the disposal section (3) by gravity.

The dilution and extraction section (2) attached to the central section (1) by means of a flange with peripheral screws (23) has a cylindrical shape and possesses a second blower (12). The said dilution and extraction section (2) is made by double walls, one internal (13) and one external (14) similar to those of the central section (1). An optional third wall (15) may be added for external insulation purposes, coated with a glass wool type of thermal insulating (8).

The said dilution and extraction section (2) starts as an extension of the central section (1) with the thermal column extending upwards and in the same way that the central section is also supplied by tuyeres or bidimensional nozzles (16), for the combustion dilution process. The layout and the number of these nozzles depend fundamentally on the reactor project. Along its axis, its diameter is strategically reduced to fit with the thermal column in order to stabilize it and not allow cold gases to escape in the extraction.

The ratio of this reduction, as well as its positioning depend on the combustion project parameters.

Thereafter, it widens forming a sort of diffuser (17) to adjust the conditions for the gases to escape, establishing a good escape speed, within the extent permitted. Likewise, the outlet diameter of the diffuser (17) depends on the parameters of the combustor project as a whole. After the diffuser, there is a snail system (18) to lead the gases out of the reactor, without load loss in the process. Above the referred snail (18) there is a safety valve (19) for by-pass purposes of the gases in case of emergency. As already mentioned, this entire section is supplied by independent air originated from another blower (12) for the dilution of the gases, in other words, air excess for a complete combustion and temperature control of the extraction gases. Its supply is electronically controlled by the amount of $O_2$, CO and the temperature of the extraction gases measured at the side air outlet (20).

The main function of the dilution and extraction section (2) is to promote the complete combustion of the gases originated from the primary central section (1). This combustion must take place with a small excess of $O_2$ measured at the side air outlet (20) duct, to ensure that all fuel gases have been burned. Finally, the burnt gases are released to the exterior with controlled pressure and temperature.

The disposal section (3) attached below the central section (1) by a flange and peripheral screws (23) is where the solid material is collected in a refractory crucible (21) and maintains its temperature in the range of 1,100° C. to 1,300° C. It is of the cylindrical type with an external wall (22) of the same diameter as the central section (1), being connected by means of peripheral screws (23).

Completing the side, between the crucible (21) and the external wall (22) there is a glass type thermal insulating filler (8), which makes the insulation.

The combustion by-product material, mostly ashes, is then removed from the crucible by means of a suction device (24) intermittently, in other words, at each pre-defined time span and adjusted with the process conditions. This material is then collected in a container (25). The base of the disposal section (3) has a lid (26) for cleaning and removing the residual solid or pasty material, which impregnated during the reactor operation. This lid (26) also aids in the reactor maintenance.

Optionally, the disposal section (3) may liquefy the ashes, producing as a by-product of the process, a matrix of solid and totally inert material.

To that end, according to image 5, this disposal section (3) is modified and must contain:

A crucible (27) for 1,600° C. of continuous work, made of refractory which fills the entire inner part to the external wall (31);

A burner (28), whose flame temperature is superior to 1,600° C.;

Finally, a refractory tube (29) at the bottom of this section (3) for removing the material still in liquid state followed by a system of collection or waiting (30).

The "REACTOR FOR ADVANCED COMBUSTION PROCESS FOR BURNING BIOMASS AND WASTE" is distinguished for having circulating air on its side walls, both in the central section, as well as in the dilution section, for cooling them, without the need for refractories as in the conventional models.

Besides that, it has tuyeres or bidimensional air nozzles on its inner wall (central and dilution section), which produce a central and vertical thermal column during the combustion process with elevated temperature in the center and low temperature at the edge, that is, on the inner wall of the reactor. The number and the layout of the tuyeres inside the reactor vary depending on the combustor project.

It has no refractory on the side section of the reactor, as the conventional models. In these models, there is an external wall of refractories to protect against the extreme internal heat, around 900° C. By utilizing this wall, a gradient is formed along its width, slowly lowering the temperature up to the external part, to a predetermined value of 70° C. In the proposed model, the burning takes place in a stable cyclone-shaped column in the center of the reactor. Concentrating in this region the high temperature of combustion which reaches values of approximately 900° C. The blowers compress the air so that part of it circulates in the internal cavity of the steel wall of the reactor in helical movements and the other in the external wall. Its thermal cooling gradient occurs in three different steps, one by the surrounding air the cyclone-shaped burning column in the center of the reactor from 900° C. to 500° C., the second by surrounding air in the external part of the reactor of 200° C. and, at last, in the external layer of thermal insulating from 200° to 70.

It features a controlled air injection system, which consists of two blowers in the same reactor: one in the superior part for dilution control and the other in the central part to control the burning rate, in the primary combustion.

It has countless air nozzles on the central inner wall of the reactor to form the tangential air jet that will give rise to the cyclone.

It also has air nozzles on the inner wall of the dilution section, independent from the nozzles of the central section, to control the end of the burning and the outlet temperature of the reactor gases.

It features a flexible disposal section, in two forms: ashes removal by suction or liquefaction of them through a thermal burner, followed by drainage in the liquid form.

It is a flexible reactor, which allows the burning of solid material, liquid fuel or a mixture of both, solid and liquid (in this case, even inert), both injected from the side of the equipment, in the burning zone under strong cyclone effect, produced by air injection, without jeopardizing the combustion.

It is certain that when this utility model is put into practice, modifications may be introduced regarding certain construction and form details, without it implying departing from the fundamental principles that are clearly substantiated in the claim framework, thus being understood that the terminology employed was for the purpose of description and lot limitation.

The invention claimed is:

1. A REACTOR FOR ADVANCED COMBUSTION PROCESS FOR BURNING BIOMASS AND WASTE for treatment of solid waste by burning solid (or liquid) industrial hazardous, chemical, pharmaceutical and industrial combustion waste comprising:
   a reactor that has a complete combustion in a single cylindrical volume, processed under a thermal cyclone effect produced by air nozzles on its inner sidewall, wherein an entire combustion takes place in a single volume; and
   a verticalized cylindrical structure comprising three serial sections, which are a central section (1), a dilution and extraction section (2) and a disposal section (3), that are mutually joined by means of flanges and screws (23), wherein the central section (1) being constituted by an internal wall (5) which forms a tubular cylindrical structure surrounded by an external wall (6), whose inferior portion has a progressive diameter reduction, which keeps a spacing in relation to the internal wall (5) and an outermost third wall (7), which interweaves a thermal insulating material (8);
   wherein the central section (1) has a supply duct (9) and a burner (3) which enters a tubular cylindrical structure and a side blower (10) with an output nozzle, which is positioned on the interface between the internal wall (5) and the external wall (6), with the internal wall (5) being equipped with tangential tuyeres (11);
   wherein the dilution and extraction section (2) is attached above the central section (1) by means of a flange with peripheral screws (23), being constituted by an internal wall (13) which forms a tubular cylindrical structure surrounded by an external wall (14), whose superior portion has a diameter reduction, which keeps a spacing in relation to the internal wall (13) and an outermost third wall (15), which interweaves the thermal insulating material (8);
   wherein the dilution and extraction section (2) further comprises:
      an outlet snail (18) in its top, which is connected to the tubular cylindrical structure by means of a diffuser (17), wherein said snail (18) is equipped with safety valves and a side air outlet (20); and a side blower (12), whose air nozzle is positioned in an interface between the internal wall (13) and the external wall (14), with the internal wall (5) being equipped with tangential tuyeres (16);

wherein the disposal section (3) is attached below the central section (1) by means of a flange and peripheral screws (23), and said disposal section (3) is constituted by a refractory crucible (21) of a cylindrical type with the external wall (22) of a same diameter as the central section (1); and wherein between the crucible (21) and the external wall (22) there is an insulating material filler (8), with an interior of the crucible being connected to a suction device (24) whose outlet nozzle is connected to a container (25), with a base of the disposal section (3) having a lid (26).

2. The REACTOR FOR ADVANCED COMBUSTION PROCESS FOR BURNING BIOMASS AND WASTE according to claim 1, the disposal section (3) further comprising a crucible (27) made of refractory material, wherein an internal wall (31) features a same diameter as the central section (1) and has a burner (28) and a bottom portion of a refractory tube (29) followed by a container of collection or waiting (30).

* * * * *